US010122710B2

(12) United States Patent
Tomlinson et al.

(10) Patent No.: US 10,122,710 B2
(45) Date of Patent: Nov. 6, 2018

(54) BINDING A DATA TRANSACTION TO A PERSON'S IDENTITY USING BIOMETRICS

(71) Applicant: PQ Solutions Limited, London (GB)

(72) Inventors: Martin Tomlinson, Devon (GB); Cen Jung Tjhai, London (GB); Andersen Cheng, London (GB)

(73) Assignee: PQ SOLUTIONS LIMITED, London (GB)

( * ) Notice: Subject to any disclaimer, the term of this patent is extended or adjusted under 35 U.S.C. 154(b) by 134 days.

(21) Appl. No.: 14/804,010

(22) Filed: Jul. 20, 2015

(65) Prior Publication Data
US 2016/0191513 A1   Jun. 30, 2016

Related U.S. Application Data

(63) Continuation-in-part of application No. 14/245,584, filed on Apr. 4, 2014, now Pat. No. 9,438,589, which
(Continued)

(30) Foreign Application Priority Data

Apr. 19, 2012 (GB) .................................. 1206863.1

(51) Int. Cl.
*H04L 29/06* (2006.01)
*H04L 9/32* (2006.01)
(Continued)

(52) U.S. Cl.
CPC .......... *H04L 63/0861* (2013.01); *G06F 21/32* (2013.01); *G06F 21/602* (2013.01);
(Continued)

(58) Field of Classification Search
CPC ............. H04L 63/0861; H04L 63/0428; H04L 63/0823; H04L 63/123; H04L 9/321;
(Continued)

(56) References Cited

U.S. PATENT DOCUMENTS 6,202,151 B1   3/2001   Musgrave et al.
6,553,494 B1   4/2003   Glass
(Continued)

FOREIGN PATENT DOCUMENTS

DE   102008029608 A1   12/2009
GB        2456509 A    7/2009
(Continued)

OTHER PUBLICATIONS

Combined Search and Examination Report under Sections 17 & 18(3) for related application No. GB 1206863.1, dated Jun. 19, 2012, in 5 pages.
(Continued)

*Primary Examiner* — Eleni A Shiferaw
*Assistant Examiner* — Sher A Khan
(74) *Attorney, Agent, or Firm* — Morris & Kamlay LLP

(57) ABSTRACT

Methods and systems are described for binding a data transaction to a person's identity using biometrics. The method comprises the generation of data which includes information associated with a transaction, or an encrypted transaction, between a server and a client device associated with a user, generating authentication data providing an irrevocable binding of the information to biometric characteristics of the user, by capturing biometric input by the user of said authentication data or information associated with the transaction, wherein this information is implanted into the captured data. A predetermined minimum number of quorum portions may be generated from a portion of the data generated or processed by the method, wherein at least a predetermined minimum number of received quorum data portions are required to reconstruct the data portion.

34 Claims, 14 Drawing Sheets

Related U.S. Application Data is a continuation-in-part of application No. 13/865,844, filed on Apr. 18, 2013, now Pat. No. 9,166,957.

(51) Int. Cl.
  *G06F 21/32* (2013.01)
  *G06F 21/60* (2013.01)

(52) U.S. Cl.
  CPC ............ *H04L 9/321* (2013.01); *H04L 9/3231* (2013.01); *H04L 9/3239* (2013.01); *H04L 9/3247* (2013.01); *H04L 63/0428* (2013.01); *H04L 63/0823* (2013.01); *H04L 63/123* (2013.01)

(58) Field of Classification Search
  CPC ... H04L 9/3231; H04L 9/3239; H04L 9/3247; G06F 21/32; G06F 21/602
  See application file for complete search history.

(56) References Cited

U.S. PATENT DOCUMENTS

| | | | | |
|---|---|---|---|---|
| 6,904,525 | B1* | 6/2005 | Berson | G06K 19/086 705/59 |
| 7,512,398 | B2* | 3/2009 | Chambers | G06F 21/64 379/127.02 |
| 7,599,489 | B1* | 10/2009 | Spracklen | H04L 9/0643 380/28 |
| 7,606,768 | B2 | 10/2009 | Graubart et al. | |
| 7,689,832 | B2 | 3/2010 | Talmor et al. | |
| 8,060,922 | B2 | 11/2011 | Chrichton et al. | |
| 8,935,532 | B2 | 1/2015 | Mittal | |
| 9,202,032 | B2* | 12/2015 | White | G06F 21/32 |
| 2003/0012415 | A1 | 1/2003 | Cossel | |
| 2003/0120757 | A1* | 6/2003 | Baldwin | G06Q 10/109 709/220 |
| 2003/0182585 | A1 | 9/2003 | Murase | |
| 2003/0200217 | A1* | 10/2003 | Ackerman | G06F 21/32 |
| 2003/0200447 | A1* | 10/2003 | Sjoblom | G06F 21/32 713/186 |
| 2003/0227478 | A1* | 12/2003 | Chatfield | G06Q 10/10 715/751 |
| 2004/0015762 | A1* | 1/2004 | Klotz | G06F 11/2294 714/742 |
| 2004/0143556 | A1* | 7/2004 | Graubart | G06Q 20/3821 705/76 |
| 2005/0015457 | A1 | 1/2005 | Warasawa | |
| 2005/0028064 | A1* | 2/2005 | Thomas | G06F 21/83 714/752 |
| 2005/0065824 | A1 | 3/2005 | Kohan | |
| 2006/0173794 | A1* | 8/2006 | Sellars | G06F 21/10 705/76 |
| 2006/0291657 | A1* | 12/2006 | Benson | G05B 13/0275 380/270 |
| 2007/0217649 | A1 | 9/2007 | Lowe | |
| 2007/0299671 | A1* | 12/2007 | McLachlan | G10L 17/26 704/500 |
| 2008/0195867 | A1* | 8/2008 | Asokan | H04L 63/0861 713/176 |
| 2008/0229110 | A1 | 9/2008 | Balfanz | |
| 2009/0070587 | A1 | 3/2009 | Srinivasan | |
| 2009/0254836 | A1 | 10/2009 | Baach | |
| 2009/0287732 | A1 | 11/2009 | Hofer | |
| 2010/0017618 | A1* | 1/2010 | Golic | G06K 9/00288 713/186 |
| 2011/0047190 | A1 | 2/2011 | Lee | |
| 2011/0072500 | A1 | 3/2011 | Varghese | |
| 2011/0075883 | A1 | 3/2011 | Shaffer | |
| 2011/0138176 | A1* | 6/2011 | Mansour | H04L 9/3218 713/168 |
| 2011/0283243 | A1 | 11/2011 | Eckhardt | |
| 2012/0240045 | A1 | 9/2012 | Bradley | |
| 2012/0243687 | A1* | 9/2012 | Li | H04L 9/085 380/277 |
| 2013/0006642 | A1 | 1/2013 | Saxena | |
| 2013/0054965 | A1 | 2/2013 | Catrein | |
| 2013/0061298 | A1* | 3/2013 | Longobardi | G06F 21/42 726/6 |
| 2013/0227076 | A1 | 8/2013 | Conley | |

FOREIGN PATENT DOCUMENTS

| | | |
|---|---|---|
| GB | 2473154 A | 3/2011 |
| WO | 02080116 A1 | 10/2001 |
| WO | 0223796 A1 | 3/2002 |
| WO | 2007122726 | 1/2007 |

OTHER PUBLICATIONS

Menezes et al. "Handbook of Applied Cryptography." Chapter 8, "McEliece public key encryption," pp. 283-319. CRC Press, Oct. 1996. Retrieved from http://www.cacr.math.uwaterloo.oa/hac/about/chap8.pdf.

Rivest et al. "A Method for Obtaining Digital Signatures and Public-Key Cryptosystems." Communications of the ACM 21 (2);120-126 (1978).

FIPS Pub 186-3, Digital Signature Standard (DSS), Federal Information Processing Standards Publication. Jun. 2009, 131 pages.

McEliece, "A Public-Key Cryptosystem Based on Algebraic Coding Theory." DNS Progress Report 42-44, p. 114-116 (Jan. and Feb. 1978).

McEliece. "A Public-Key Cryptosystem Based on Algebraic Coding Theory." DSN Progress Report 42-44. pp. 114-116 (Jan. and Feb. 1978).

* cited by examiner

BINDING A DATA TRANSACTION TO A PERSON'S IDENTITY USING BIOMETRICS

CROSS-REFERENCE TO RELATED APPLICATIONS

This application is a continuation-in-part application of application U.S. Ser. No. 14/245,584 filed on Apr. 4, 2014, which is a continuation-in-part application of application U.S. Ser. No. 13/865,844 filed on Apr. 18, 2013, (both of which are incorporated herein by reference) and claiming priority from GB patent application 1206863.1 filed on Apr. 19, 2012.

FIELD OF THE INVENTION

This invention relates to data encryption and communication, and more particularly to systems and methods for improved verification of parties involved.

BACKGROUND OF THE INVENTION

Providing proof that transmitted or stored electronic data was originated by a particular user and has not been tampered with since or substituted with a forgery is not an easy problem to solve.

Authentication of public keys used to encrypt original data is traditionally done using certificates whereby a trusted third party (TPA) acts as a Certification Authority (CA) and publishes public keys and their associated owner's identities (ID's) in the form of certificates. These certificates are digitally signed using the private key of the CA so that the authenticity of a certificate may be checked by anyone using the public key of the CA.

The binding of the ID with the public key is an important issue. There are several problems with the CA approach. A central server has to be constantly available, accessible under varying traffic conditions and hacker proof. Strict security procedures need to be followed by the CA to check ID's before issuing each certificate. Also procedures need to be in place to prevent tampering of certificates. The CA has to have credible trustworthiness. Apart from checking the digital signature a user cannot directly verify the associated ID of a public key.

Other known techniques involve multi-factor authentication as recommended by government regulators (for example the US Federal Financial Institutions Examination Council). The multi-factors are typically something known (a secret number or password), something owned (a device, a computer or piece of equipment) and various types of biometric information. For example, U.S. Pat. No. 7,606,768 B2 by Graubart et al, describes a technique where the originator of a document generates a voice message which includes their ID and a secret number, a PIN. The voice message is appended to the document to form a data file. A polynomial hash of the data file is calculated and encrypted using the PIN as the basis of the encryption key. The recipient is able to authenticate the originator's ID by recognising the originator's voice in the voice message. The document is bound to the originator through the PIN encrypted hash. Provided the PIN is kept secret, a forger cannot change the document without invalidating the encrypted hash.

The disadvantage of this method described in U.S. Pat. No. 7,606,768 B2 is that while the biometric content provides strong binding to the originator's ID, the binding to the document is weak in that if a forger is able to learn the PIN then the forger can replace the document with a forged document, calculate a new encrypted hash and utilise the originator's voice message to provide authentication.

Moreover, much of current day electronic communications involves digital files and in the case of encrypted communications the encryption and decryption keys are usually stored as digital files. In many applications it is necessary to bind one or more digital files to the identity of an individual who is designated as the originator, owner or administrator of said files. An example of particular importance is the binding of a public encryption key or any shared secret to an individual to prevent impersonations such as Man In The Middle (MITM) attacks.

Conventional identity authentication systems are generally known, implementing different methods with this general aim. For example, US2003/0182585 (Mucase and Marada) discusses a technique whereby the digital file is a password and it is associated with an identity by means of the same password written by hand similar to a handwritten signature.

There is a need in some cases to provide an irrefutable association or binding of a person's identity with transmitted data by using biometrics.

STATEMENTS OF THE INVENTION

Aspects of the present invention are set out in the accompanying claims.

According to one aspect of the present invention, a method is provided of generating transaction data associated with a transaction between a first device, such as a server, and a second device associated with a user; generating authentication data by i) prompting the user to record biometric input of information associated with the transaction or bound to the transaction; and ii) capturing audio and/or image data of the biometric input of the information by the user in response to the prompting, wherein the information is implanted into the captured audio and/or image data. The transaction data and the associated authentication data may be transmitted to the first device, the authentication data providing an irrevocable binding of the data to at least one biometric characteristic of the user.

The information associated with the transaction may comprise binding data derived from the transaction, whereby the binding data is implanted into the captured audio and/or image data. The binding data may be derived by extracting a portion of the transaction data or computing a function of the transaction data. The information may comprise at least a portion of a unique identifier generated for the transaction or a cryptographic hash of a portion of the transaction or a digital signature of the transaction The implanted information from the received authentication data may be verified, and the identity of the user associated with the request may be determined from the received authentication data. The information may be implanted into one or more biometric information files by enunciating or writing said information, or by hand or body gestures representative of said information.

The transaction data may comprise an encrypted data portion associated with sensitive information of or relating to the transaction, or a data portion associated with the transaction subject to Multi-Party Computation (MPC). The information associated with the transaction may comprise binding data derived from at least the encrypted data portion. The binding data may be derived by extracting at least a portion of the encrypted data portion or computing a function of the encrypted data portion as the binding data, whereby the binding data is implanted into the captured audio and/or image data.

The cryptographic key used to encrypt the data portion may be a conventional symmetric or asymmetric key. A symmetric encryption key may be retained by the user until the sensitive information of the transaction is to be retrieved. The cryptographic key may be split into multiple keys such that a quorum of participants need to act together in order to reconstruct the encryption key. Alternatively the data portion itself may be split into information pieces such that a predetermined minimum number of quorum information portions are generated from original data, wherein at least a predetermined minimum number of received quorum data portions are required to reconstruct the original data. The received plurality of quorum portions usually includes at least one portion received from the client device.

The plurality of quorum portions may be generated from original data, and distributed between a plurality of entities. One or more of said entities may receive a greater proportion of said quorum portions. The entities may comprise one or more of a computing device, an authentication token and a security dongle. Identified discrepancies in received quorum portions may be used to identify the associated entity presenting quorum portions containing corrupted or erroneous values. Each quorum portion may comprise one or more data values each identifying a solution to a respective one of a series of equations that encode dependencies between data values of the original data, each equation associated with a single unknown dependent data value.

The plurality of quorum portions may be generated from said original data, by defining a quorum code including data values associated with original data to be encoded, and a predefined number of dependent data values; determining each said dependent data value as a solution to a respective one of said series of equations that encode dependencies between data values of the original data; and defining each quorum portion as one or more of said dependent data values.

The reconstructed data may be determined from a received plurality of quorum portions, using a series of reconstruction equations each associated with a single unknown value of the candidate data, wherein the reconstructed data includes data values corresponding to the original data and data values corresponding to the plurality of quorum portions generated from said original data.

The plurality of quorum portions may be generated from said original data, wherein each quorum portion includes a corrupted data value at a respective defined position in the original data, and distributing the plurality of quorum portions to a plurality of entities.

At least a predetermined minimum number of quorum portions generated from original data may be received, wherein each quorum portion includes a corrupted data value at a respective defined position in the original data; and the original data may be reconstructed from the received versions, wherein the original data is reconstructed from the majority data value at each respective defined position of the received quorum portions.

At least a predetermined minimum number of quorum portions generated from original data may be received, wherein each quorum portion comprises a respective partial encryption key, and at least one ciphertext portion generated by encrypting the original data using an associated encryption key formed from a defined combination of said partial encryption keys; and the received ciphertext portions may be decrypted using an associated decryption key formed from the defined combination of received partial encryption keys, to recover the original data.

Each quorum portion may be received from a corresponding computing device, together with additional data associated with the computing device, and wherein the defined series of reconstruction relationships encode dependencies between data values of the received versions and the additional data. The additional data may be associated with a current location and/or current time and/or current date and/or identity of the computing device.

The original data may be a sensitive data file, an encryption or decryption key, an authentication key or a password. The transaction data may comprise a plurality of generated authentication data in a nested arrangement whereby successive trusted third parties provide authentication data which may be used to provide additional authentication.

According to another aspect of the present invention, a method is provided of receiving, at a server, transaction data including information associated with a transaction between the server and a client device associated with a user; receiving authentication data including captured audio and/or image data of the biometric input of the information by the user, providing an irrevocable binding of the transaction data to at least one biometric characteristic of the user; verifying the received authentication data; and processing the received transaction data.

According to a further aspect a portion of the transaction data is encrypted with a part or all of the encryption controlled by the user such that there is an irrevocable binding of this encrypted data to the user and his/her ID by at least one biometric characteristic of the user by means of a cryptographic hash or a digital signature of this encrypted data being implanted into a biometric file by the user. This is accomplished by means of audio and/or image data of the user enunciating a portion of said cryptographic hash or digital signature. The idea of this aspect is that the encrypted transaction data may contain confidential information that the user does not wish to disclose until some future date. The disclosure being carried out by the action of the user releasing the encryption key. Throughout the encrypted data and subsequently the plaintext data is irrevocably bound to the user by said biometric file.

According to yet another aspect, the present invention provides a method of receiving a request to initiate a transaction between a server and a client device associated with a user; generating a plurality of quorum data portions from original data associated with the transaction, wherein at least a predetermined minimum number of said quorum data portions are required to reconstruct the original data; generating authentication data by capturing biometric input by the user of information associated with the transaction, wherein the information is implanted into the captured data to provide an irrevocable binding of the transaction to at least one biometric characteristic of the user; and transmitting data associated with the transaction, the data including the information associated with the transaction, at least one generated quorum data portion, and the generated authentication data.

In further aspects, the present invention provides a system comprising one or more processors configured to perform the above methods. In yet other aspects, there is provided a non-transitive computer-readable storage medium storing one or more computer programs arranged to carry out the above methods when executed by a programmable device.

BRIEF DESCRIPTION OF THE DRAWINGS

There now follows, by way of example only, a detailed description of embodiments of the present invention, with references to the figures identified below.

FIG. 9, which comprises

DETAILED DESCRIPTION OF EMBODIMENTS OF THE INVENTION

Figure 1:
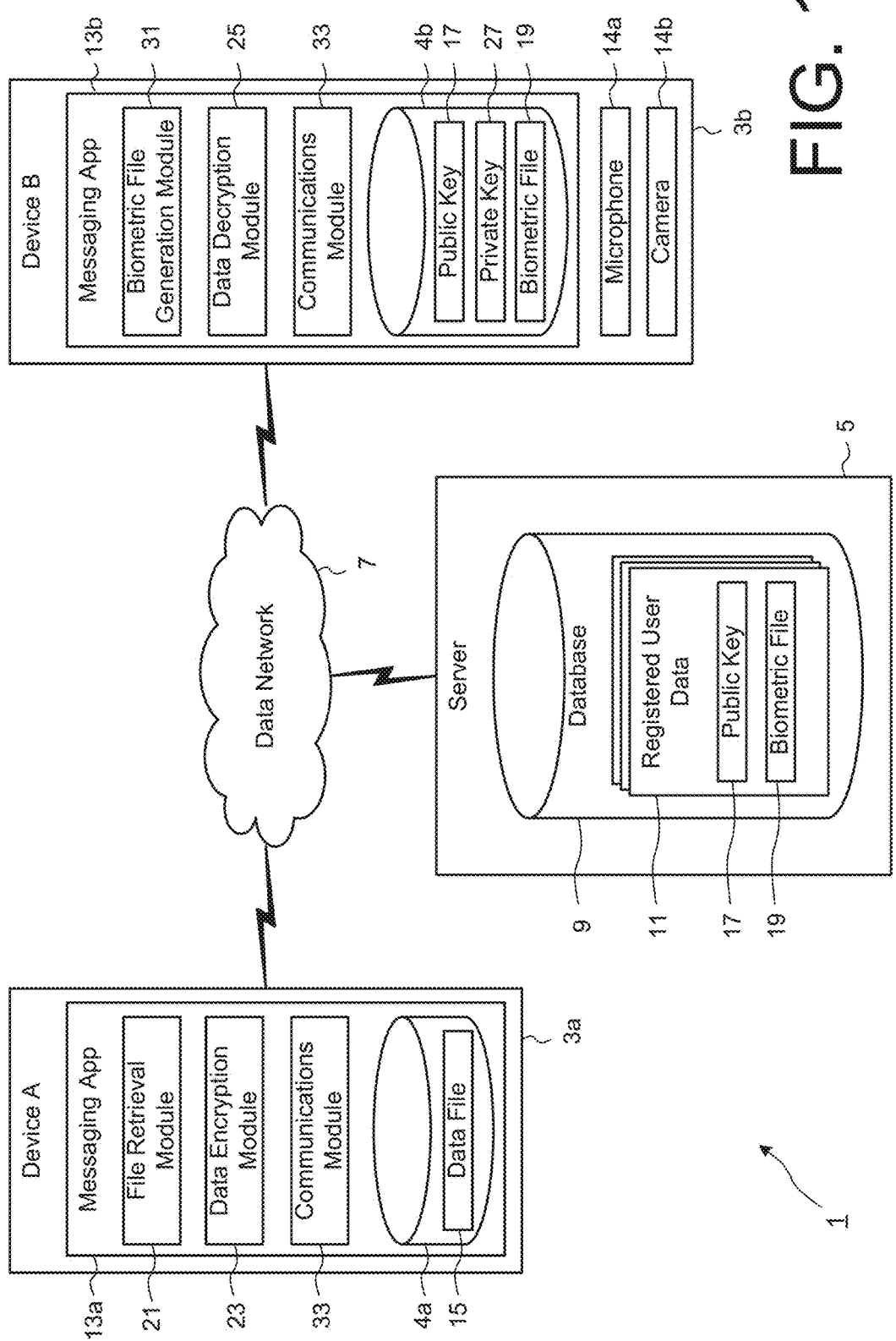
FIG. 1 is a block diagram showing the main components of a data communication system according to an embodiment of the invention.

A specific embodiment of the invention will now be described for a process of transmitting encrypted documents using a verified public key. Referring to FIG. 1, a data communication system 1 according to the present exemplary embodiment comprises a first device 3a in communication with a second device 3b via a server 5 and a data network 7. The devices 3 are associated with respective registered users of the system 1, the server 5 storing data 9 identifying each registered user in a database 11.

The devices 3 may be of a type that is known per se, such as a desktop computer, laptop computer, a tablet computer, a smartphone such as an iOS™ Blackberry™ or Android™ based smartphone, a 'feature' phone, a personal digital assistant (PDA), or any processor-powered device with suitable input and display means. The data network 7 may comprise a terrestrial cellular network such as a 2G, 3G or 4G network, a private or public wireless network such as a WiFi™-based network and/or a mobile satellite network or the Internet. It will be appreciated that a plurality of devices 3 are operable concurrently within the system 1.

In the present embodiment, each device 3 has a respective secure messaging application 13 for communicating encrypted data, such as one or more data files 15 stored in a memory 4a and/or electronic messages input by a user, with other devices 3 connected to the network 7, via the server 5. In the example illustrated in FIG. 1, the first device 3a (Device A) is associated with a first registered user, Alice, and the second device 3b (Device B) is associated with a second registered user, Bob. In order for Alice to send a message to Bob, device A 3a is configured to access the database 9 on the server 5 to obtain Bob's public encryption key 17 in order to encrypt her message prior to sending it to device B 3b.

Device A 3a is also configured to access a biometric information file 19, such as a video recording, generated by Bob using his messaging app 13b and a microphone 14a and/or camera 14b of the host device 3. By replaying the video recording on her messaging app 13a, Alice is able to identify Bob to make sure that he is indeed the person she wishes to communicate with and also to confirm that she has the correct public key for Bob and not the public encryption key of an impersonator or an interceptor, a Man in the Middle. Alice is able to authenticate the identity of Bob by recognising him as the person in the video recording, for example by recognising his face, voice, distinctive gestures, reading his lips, etc.

Figure 2:
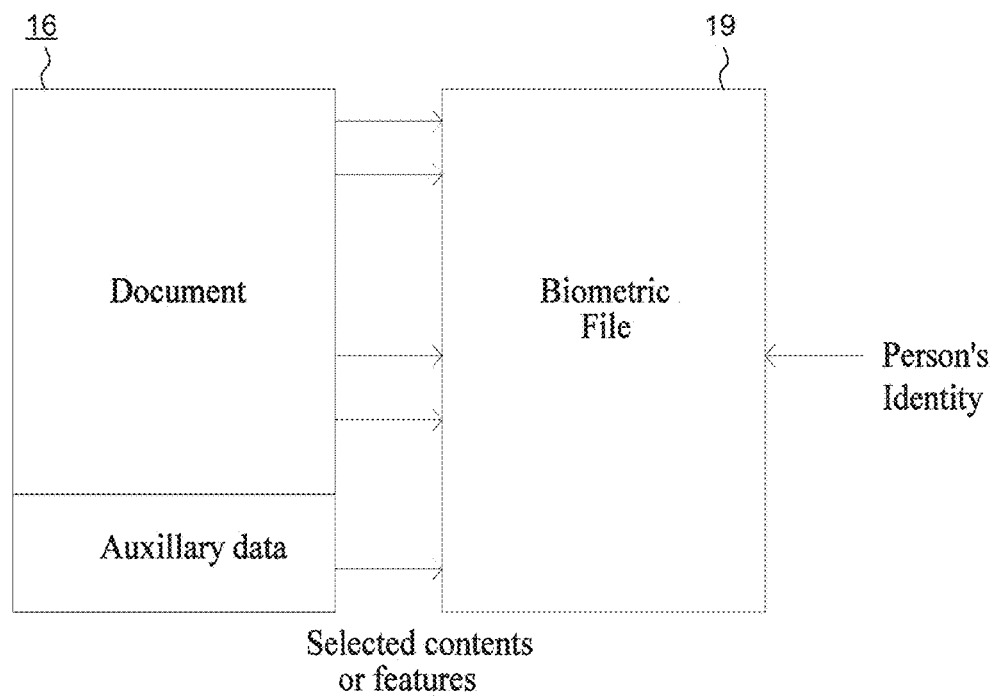
FIG. 2 is a block diagram schematically illustrating an example of biometric file construction.

The present embodiment is described by way of example in which a first digital data file is a document containing information such as a public encryption key appended with auxiliary data. Auxiliary data may consist of the document originator's ID, a time stamp, type of document and any other data. Hereinafter this file in totality is referred to as a media file 16. As schematically illustrated in FIG. 2, selected contents of a document plus auxiliary data can be implanted into a second digital data file, referred to as a biometric information file 19, which is generated by a registered user so that their identification may be discerned by a recipient from the biometric information file 19. For example, the media file 16 contains the public encryption key 17 of a user and the biometric information file 19 is a video recording made by the same user. These two data files are stored in the database 9 on the server 5 for each registered user 11.

Accordingly, the messaging application 13a of device A 3a includes a file retrieval module 21 for retrieving Bob's media file 16, containing his public key 17, and for retrieving his associated biometric information file 19, from the database 9 of the server 5. The messaging application 13a also includes a data encryption module 23 for encrypted data files 15 using the retrieved public key 17. The messaging application 13b of device B 3b includes a data decryption module 25 for decrypting received encrypted data files 15 using the associated registered user's private key 27. The messaging application 13b also includes a biometric file generation module 31 for generating a biometric file as described below. The registered user's public key 17 and generated associated biometric file 19, as well as the private key 27 may be stored in a memory 4b of the device 3b.

Each messaging application 13 also includes a communications module 33 providing an interface for communication of data therebetween, via the data network 7 and the server 5. It will be appreciated that, although not illustrated, the messaging applications 13a, 13b may also include the complementary data processing modules to both generate the biometric file and retrieve the public key, as well as to both encrypt and decrypt data.

Figure 3:
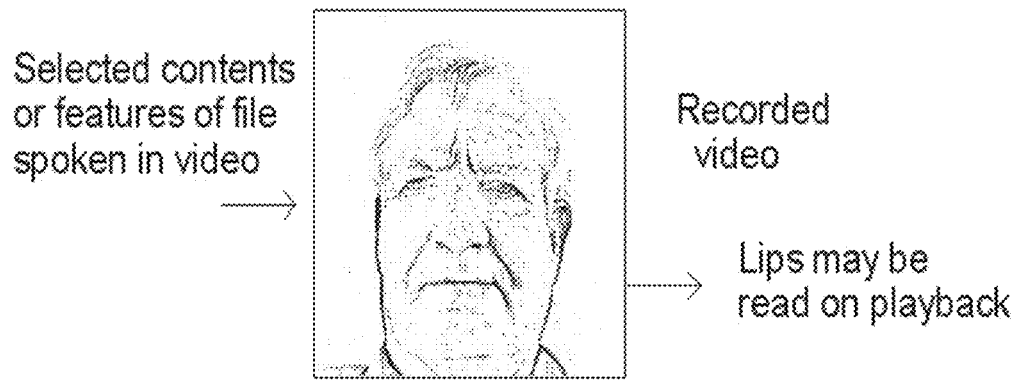
FIG. 3 illustrates an example of a biometric file based on recorded video.

The biometric file generation module 31 can be configured to generate the biometric information file according to one or more of a number of different techniques. For example, the biometric information file may be constructed so as to contain said contents or features of the first digital file. In the present embodiment, as illustrated in FIG. 3, the originator of the digital file, or a trusted person produces a video recording showing his or her face with their lips clearly visible, and enunciates the values of said contents or features. In the present exemplary embodiment, the biometric information file 19 can include a video recording of Bob enunciating a defined portion of his public key, such as the first ten characters. On replay of the video recording, from the images and the audio, the viewer is firstly able to identify the person who is claiming to be the originator and/or owner of the associated media file, and secondly able to discern the said contents or features, namely parts or features of the media file. These identified details may be corroborated with the received media file itself. For example, the messaging application 13 may be configured to prompt the user to input the name of the identified person and some or all of the discerned portion of the public key from the received biometric information file 19. The messaging application 13 can then verify that the user input details matches the respective data of the associated media file, before allowing data to be encrypted using the received public key.

Figure 4:
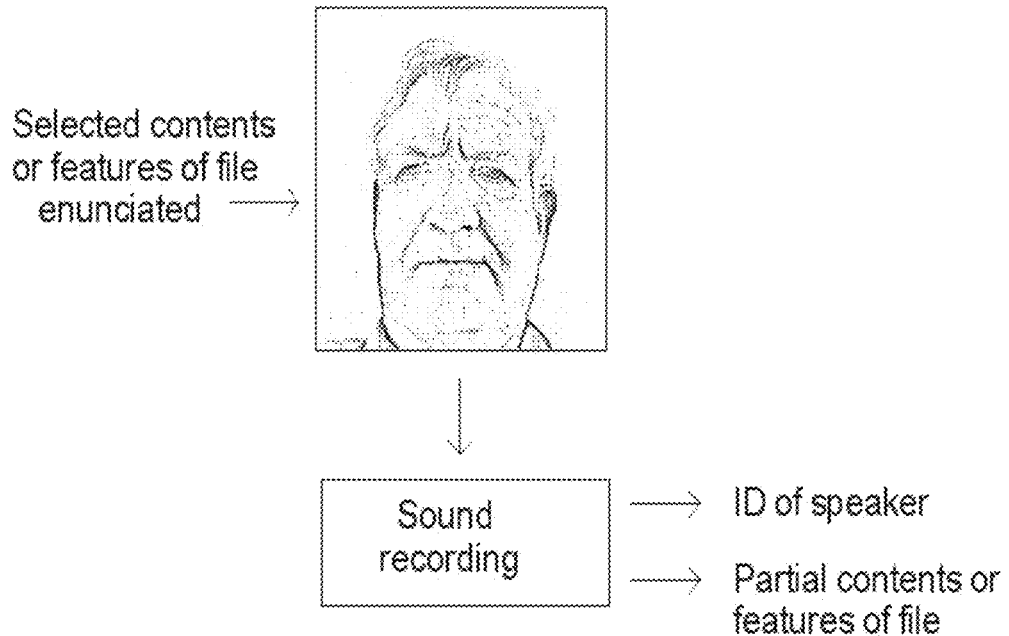
FIG. 4 illustrates an example of a biometric file based on recorded audio.

In an alternative embodiment, the person providing the biometric authentication information, who may be the originator of the media file or a trusted third party, makes a sound recording of themselves describing some of the contents or features of the media file, for example as illustrated in FIG. 4. The recipient of the media file and the biometric file, which is an audio recording in this embodiment, is able to identify the speaker by recognising his or her voice from the received audio recording. The recipient is also able to check and verify that the contents or features described by the speaker in the audio recording are the same as those of the associated media file.

Figure 5:
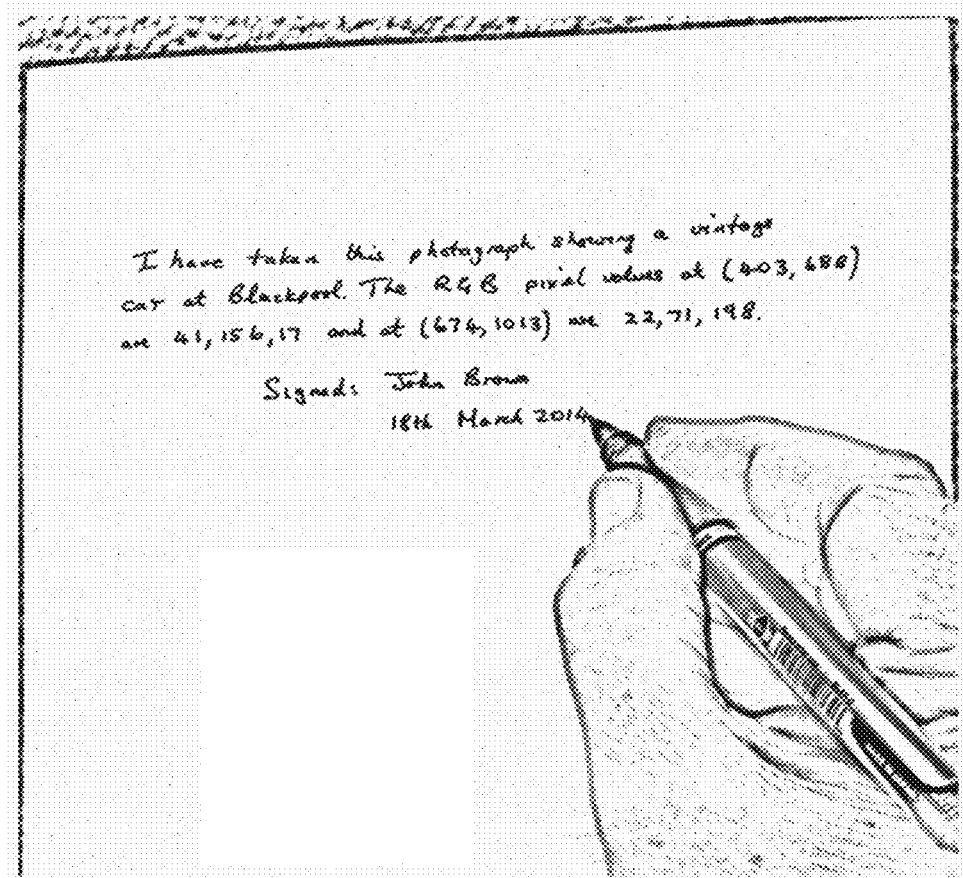
FIG. 5 illustrates an example of a biometric file based on description, replicated values and signature.

In a further alternative embodiment, the biometric information file consists of a video recording or a photograph of the originator, or trusted third party writing down details of the media file and optionally signing his or her name. An example in the case of a media file being a digital photograph is that of the originator writing down some of the pixel values for a number of different pixel coordinates. This is shown in FIG. 5 where the originator has written down the X and Y pixel coordinates followed by the Red, Green and Blue pixel values from the RGB format of the digital photograph. The pixel at 403 pixels from the left side and 688 from the bottom has red value 41, green value 156 and blue value 17 and the pixel at 674 pixels from the left side and 1013 from the bottom has red value 22, green value 71 and blue value 198 as illustrated in FIG. 5, which also includes the originator, or trusted third party signing and dating the document.

Figure 6:
FIG. 6 illustrates an exemplary table of hand gestures alphabet which may be used in biometric file construction.

It is appreciated that other forms and types of biometric information file may be constructed. Some of the contents, features or derived values of the media file may be communicated by means of gestures of the body recorded in the video recording. As an example, signing using a language utilised by hearing-impaired people may be used. FIG. 6 shows an exemplary look up table for hand gestures and letters of the alphabet.

Another embodiment of the invention will now be described with reference to FIG. 7, using corresponding reference numerals to those of preceding figures where appropriate for corresponding elements, for a computer-implemented process of handling a secured transaction between two computing devices, in this embodiment a server and a client device. As shown, a data communication system 41 according to the present embodiment comprises a transaction server 43 in communication with a client device 45 over a data network 7, via respective network interfaces 33. The client device 45 may be associated with a registered user of the system 41 or a user wishing to register with the system 41. The server 43 may store data identifying each registered user, for example in one or more databases 47. Typically, although not necessarily, data communication sessions between the computing devices over the data network 7 are encrypted, for example using TLS or SSL protocols as are well known in the art.

The client device 45 may be of a type that is known per se, such as a desktop computer, laptop computer, a tablet computer, a smartphone such as an iOS™ Blackberry™ or Android™ based smartphone, a 'feature' phone, a personal digital assistant (PDA), or any processor-powered device with suitable input and display means. It will be appreciated that a plurality of devices 45 are operable concurrently within the system 41.

In the present embodiment, the client device 45 has an application module 49 for interacting with a data processing module 51 of the server 43 and communicating data, such as one or more transaction data messages generated by the application module 49 for handling by a request handler module 53 of the data processing module 51. The transaction data includes information associated with the transaction between the client device 45 and the server 43, for example binding data 57 that is linked to the transaction, such as one or more of a unique identifier of the transaction generated by the data processing module 51 of the server 43 or the application module 49 of the client device 45, a time stamp, session ID, etc. and/or binding data 57 that is derived from the transaction, such as a digital signature or hash value that is computed from predefined data aspects of the transaction. Transaction data 55, including the binding data 57 associated with the transaction, may be stored in a memory 4b of the client device 45. The data processing module 51 of the server 43 may also store transaction data 55 including the binding data 57 in the one or more databases 47.

Similar to the messaging app 14a described in the first embodiment, the application module 49 in this embodiment is also configured with a biometric file generation module 31 to generate a biometric information file 19 including captured audio and/or image data of the biometric input of information associated with or derived from the transaction. The biometric information file 19 provides a binding of the transaction data, or at least the binding data portion 57, to biometric characteristics of the user associated with the client device 45. The information associated with or derived from the transaction may be implanted into the biometric information file 19 by capturing audio and/or image data of the biometric input of the information by the user associated with the client device 45, using a microphone 14a and/or camera 14b. For example, the application 49 may be configured to prompt the user to input some or all of the binding data 57 associated with the transaction, such as a transaction ID that is generated for the transaction or a hash value that is computed from predefined data elements of the transaction data 55.

The data processing module 51 may store the received biometric information file 19 with the respective transaction data 55 in the one or more databases 47. The data processing module 51 may include a biometric file verification module 59 to verify the implanted information from the received biometric information file 19, and to determine the identity of the user associated with the request from the received authentication data. For example, the biometric file verification module 59 may perform image and/or audio data processing of the image and/or audio data in the received biometric information file 19, to retrieve the information that was implanted into the biometric information file 19 and to verify a match with the stored binding data 57 of the transaction. The biometric file verification module 59 may also perform processing of the received image and/or audio data to identify a match with stored user data, such as a pre-registered voice print sample or a passport photograph, in order to determine an identity of the user associated with the received transaction data. The biometric file verification module 59 may be configured to request the user's voice print sample or passport photograph from a separate trusted data source.

The application module 49 of the client device 45 may also include an encryption module 61 for the client device 45 to encrypt data prior to transmission to the server 43. The data processing module 51 of the server 43 may also include corresponding decryption module 63 to decrypt received encrypted data, such as an encrypted data portion 65 of the transaction data 55 associated with particularly sensitive or confidential information of the transaction. A symmetric cryptographic key used by the encryption module 61 to generate the encrypted data portion may be retained by the user until such time that the sensitive or confidential information of the transaction is to be disclosed, whereby the decryption module 63 cannot decrypt the encrypted data until the symmetric cryptographic key is received from the user.

Figure 7:
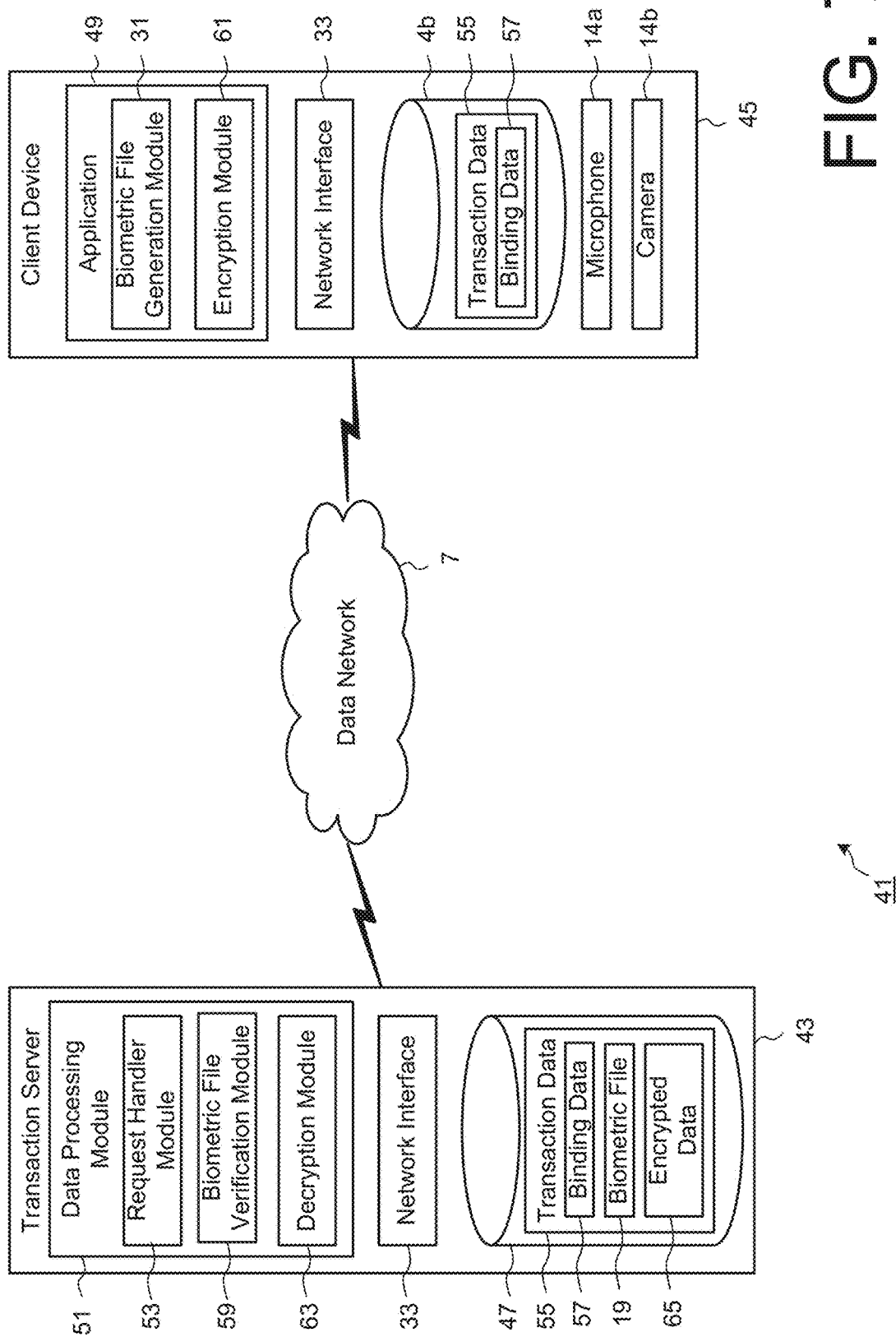
FIG. 7 is a block diagram showing the main components of a data communication system according to another embodiment of the invention.
Figure 8:
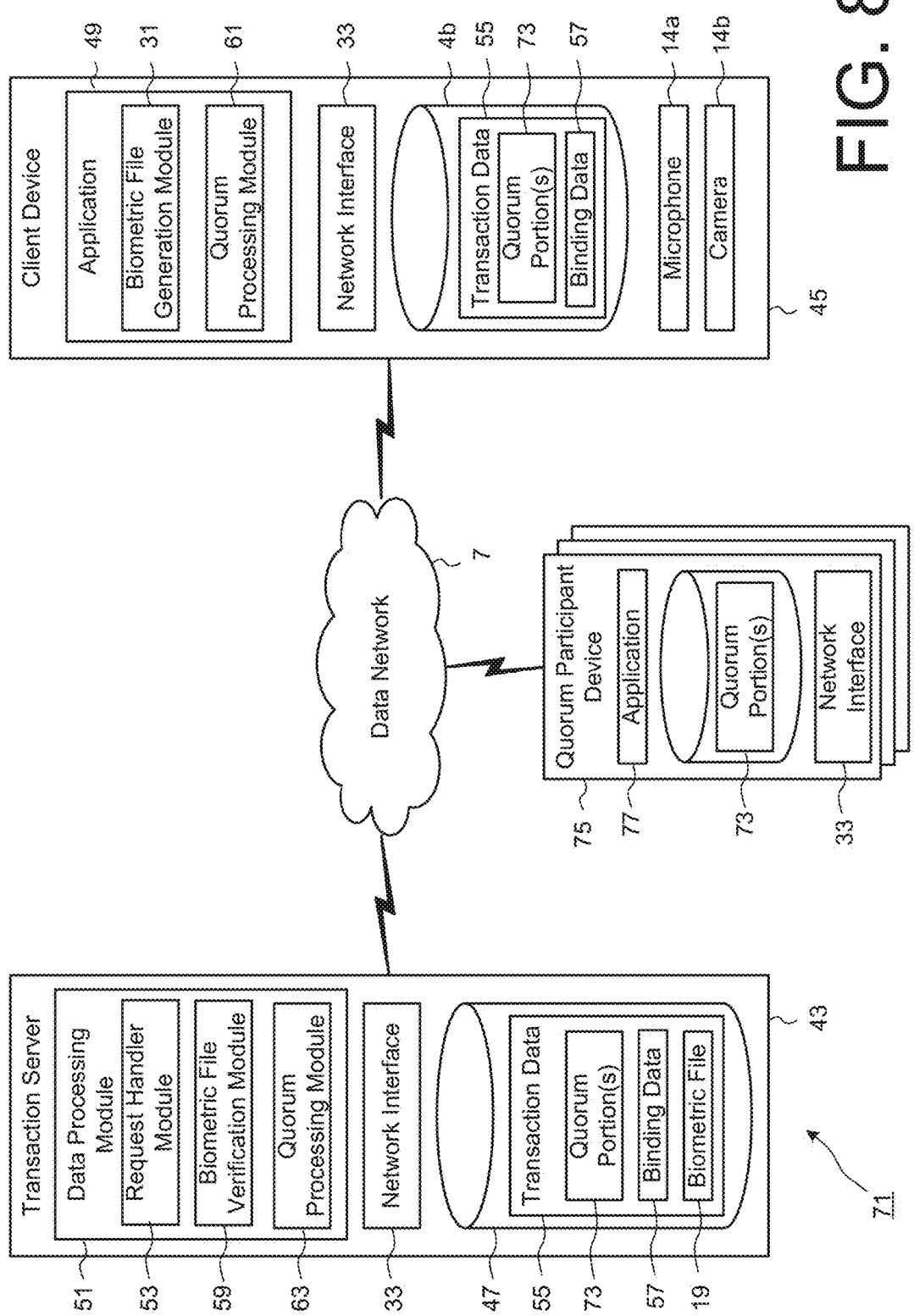
FIG. 8 is a block diagram showing the main components of a data communication system according to a further embodiment of the invention.

FIG. 8 is a block diagram of an alternative embodiment of a data communication system 71, based on the system illustrated in FIG. 7, in which the encryption module 61 and the decryption module 63 are configured to perform quorum-based encryption and decryption of sensitive or confidential data associated with a transaction to be transmitted therebetween, for example as described in the applicants' co-pending application Ser. No. 14/683,379, which is incorporated herein by reference in its entirety. In this alternative embodiment, recovery of the sensitive data is only possible when a predefined minimum number of associated quorum data portions 73 are received from a corresponding quorum of available authorised participants, for example the registered user associated with the client device 45 and one or more users of the transaction server 43 who are authorised to participate as quorum members within the secured computing environment, each associated with a respective quorum participant device 75 in communication with the transaction server 43 via the data network 7. Each quorum participant device 75 may execute an application module 77 to communicate the respective stored quorum data portions 73 to the data processing module 51 via a corresponding network interface 33. One or more quorum portions 73 may also be stored by the server 43 with the respective transaction data 55 in the one or more databases 47.

For example, the transaction server 43 may require provision of sensitive data from the client device 45 as part of a registration process initiated by a registration request from the application module 49. The sensitive data may be processed by the quorum encryption module 61 into a plurality of quorum data portions 73 that are distributed amongst the devices of authorised participants. Alternatively, the sensitive data may be encrypted by the quorum encryption module 61 using a cryptographic key, and the cryptographic key itself may be processed into a plurality of quorum key data portions 73 that are distributed amongst the devices of authorised participants. The secured computing environment provided by this embodiment may facilitate secured access to the original sensitive data by the quorum of authorised personnel including the registered user, as part of the process of handling a subsequent transaction request. As one example, the quorum decryption module 63 may reconstruct the original sensitive data from the predefined minimum number of quorum data portions 73 received from the quorum of authorised personnel. As another example, the quorum decryption module 63 may reconstruct the cryptographic key from the predefined minimum number of quorum data portions 73 received from the quorum of authorised personnel, the reconstructed cryptographic key enabling decryption of and access to the original sensitive or confidential data. In this way, the system 71 inherently requires and verifies the presence of a predetermined minimum number of users, including the registered user associated with the particular transaction, for quorum-based recovery of the original sensitive data.

FURTHER EMBODIMENTS, ALTERNATIVES AND MODIFICATIONS

Further embodiments will now be described using corresponding reference numerals to those of preceding figures where appropriate for corresponding elements.

In an alternative embodiment, instead of communicating directly the contents, features or derived values of the media file in a video recording, sound recording or photograph as described in the embodiment above, the biometric file is constructed whereby the contents, features or derived values of the media file are communicated indirectly, by using a codebook look up table where a prearranged phrase or word is substituted for each phrase, word or character used to represent the contents, features or derived values of the media file. An example is given in the codebook look up table below in Table 1.

TABLE 1

Example of part of a codebook look up table to be used in constructing and decoding the biometric file.

| Input value, word or phrase | Output |
| --- | --- |
| Photograph | Code A |
| Public encryption key | Code B |
| Secret information | Code C |
| Pixel coordinates | Image violet |
| Pixel values | Flowers |
| Number | Stars |
| 1 | Twig |
| 2 | Root |
| 3 | Branch |
| 4 | Leaf |

Using a secret or undisclosed codebook look up table in the construction of the biometric information file so that only the corresponding entries of the codebook table and not the actual contents, features or derived values of the media file means that these are encrypted or obfuscated in the biometric information file. This makes the forging of a biometric file more difficult.

In yet a further embodiment, a series of biometric files may be constructed and provided by a number of trusted third parties each describing the contents, features or values of a first media file plus the contents, features or values of the associated biometric files in a nested authentication arrangement. This can be useful in cases where the originator of the document is not expected to be known to the intended recipient but a number of trusted third parties are expected to be known to the recipient.

Figure 9A:
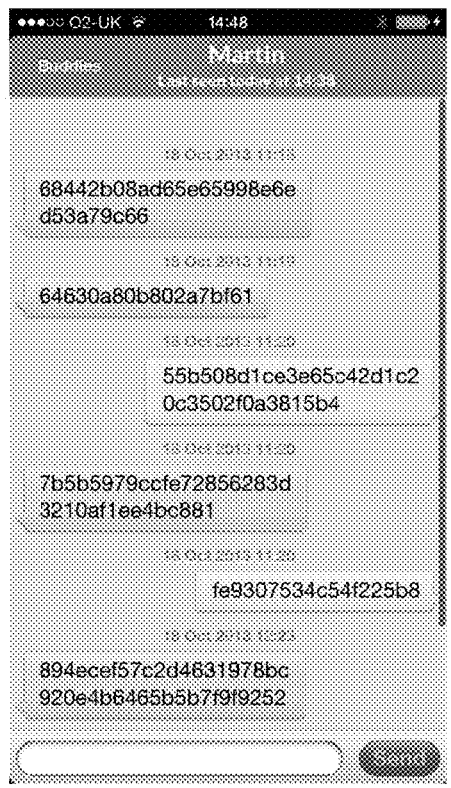
FIGS. 9A and 9B, is an example of received and sent ciphertexts and their corresponding decrypted messages displayed by messaging applications according to an embodiment of the invention.
Figure 9B:
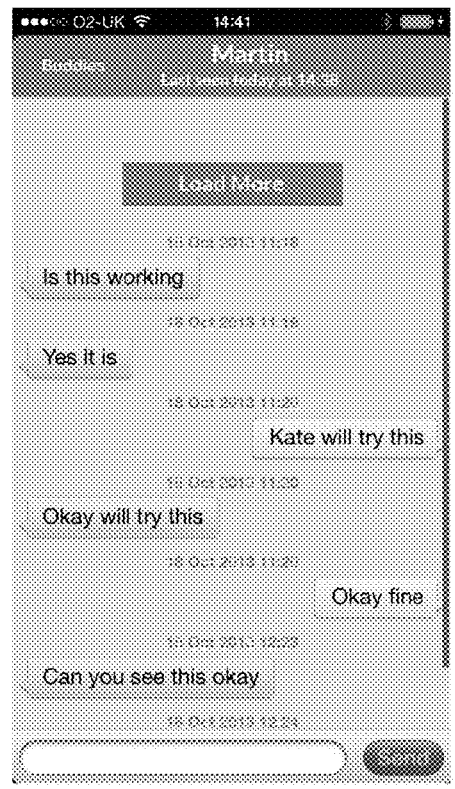
Figure 10:
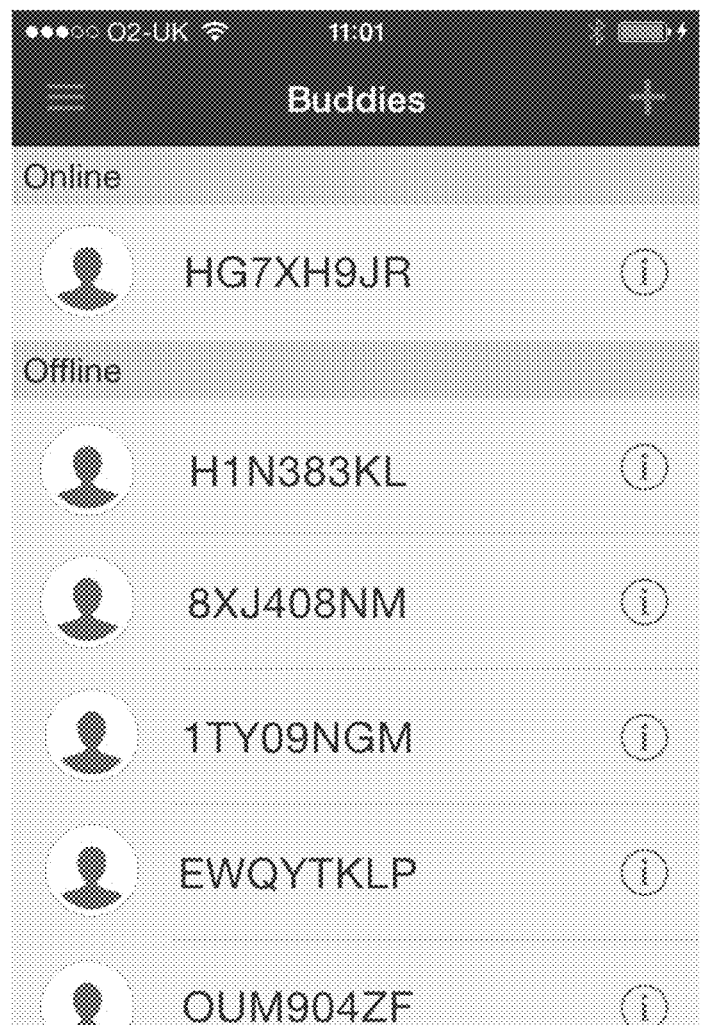
FIG. 10 is an example of a list of random IDs of other users displayed by messaging applications according to an embodiment of the invention, along with associated information symbols which, if permission is granted, enable associated biometric files to be accessed for verification of the true user's identity.

As yet a further embodiment, the invention can be further used to provide identification to what appears to be an anonymous sender ID. The messaging application 13 allows users to send and receive secure messages by encrypting each message using the public keys of the intended recipients. Employing their configured devices 3, the recipients download sent ciphertexts and the messaging application 13 uses their private keys to decrypt the contents of each ciphertext and display each corresponding message. This is illustrated in FIGS. 9A and 9B, which shows the example messages before and after decryption, respectively. A feature of the messaging application 13 is an anonymous mode in which each user is allocated an anonymous, random ID rather than their name, telephone number or email address. The idea is that users are able to invite other users to send each other messages without the risk of follow up communications by traditional means. This is illustrated in FIG. 10 where invited users appear as a list under the heading Buddies, displayed by messaging applications according to this alternative embodiment. It can be seen that the list of contacts have randomly generated IDs.

Providing a sending user has granted their permission by previously sending the recipient the appropriate command, the recipient is able to tap on the information symbol next to the ID, as shown in FIG. 10, which results in the recipient being able to preview the biometric file constructed by the user with that random ID and determine their actual ID. For example if the recipient taps the information symbol next to H1N383KL a video recording made by the user whose random ID is H1N383KL is played to the recipient which identifies the user binding him or her to H1N383KL. In this way, a recipient of a message from a random ID is able to retrieve the associated biometric files for verification of the sender's true identity. It will be appreciated that the biometric information file in this embodiment may be generated by the transmitting entity implanting at least a portion of her public key into the associated biometric information file.

In the embodiments described above, the invention is described in the context of data communicated between messaging applications on respective devices. It is appreciated that the invention can also be implemented in a wide number of different types of applications that enable and/or facilitate secured access to digitally represented information, such as cloud-based information services, internet banking, digital rights management, personal information databases, social networking, point of sale transactions, e-mail applications, secure ticketing, message services, digital broadcasting, digital communications, wireless communications, video communications, magnetic cards and general digital storage.

In a further alternative embodiment, one or more digital files which contain media information such as documents, or numerical data such as encryption keys are aggregated into a single file, termed the source file and a message digest of this source file is calculated. The message digest function used is ideally a cryptographic hash function, such as the Secure Hash Algorithm (SHA) as discussed in Handbook of Applied Cryptography, A. J. Menezes, P. C. van Oorschot and S. A. Vanstone, CRC Press, ISBN 0-8493-8523-7, with the property that it is practically impossible to generate a different source file with the same hash value as the original. A biometric information file is generated by the originator of the source file or by a trusted third party, likely to be known to the intended recipient of the source file. One or more biometric information files are generated in such a way that all or part of the message digest value is contained within each file. The recipient of a biometric information file and the source file is able to determine the identity of the originator, or trusted third party, and all or part of the message digest value from the biometric information file and check that this corresponds to the calculated message digest of the received source file.

In a further embodiment of the invention the source file is digitally signed by the originator, or by a trusted third party, using a cryptographic key and all or part of the digital signature is contained in a biometric information file.

Figure 11:
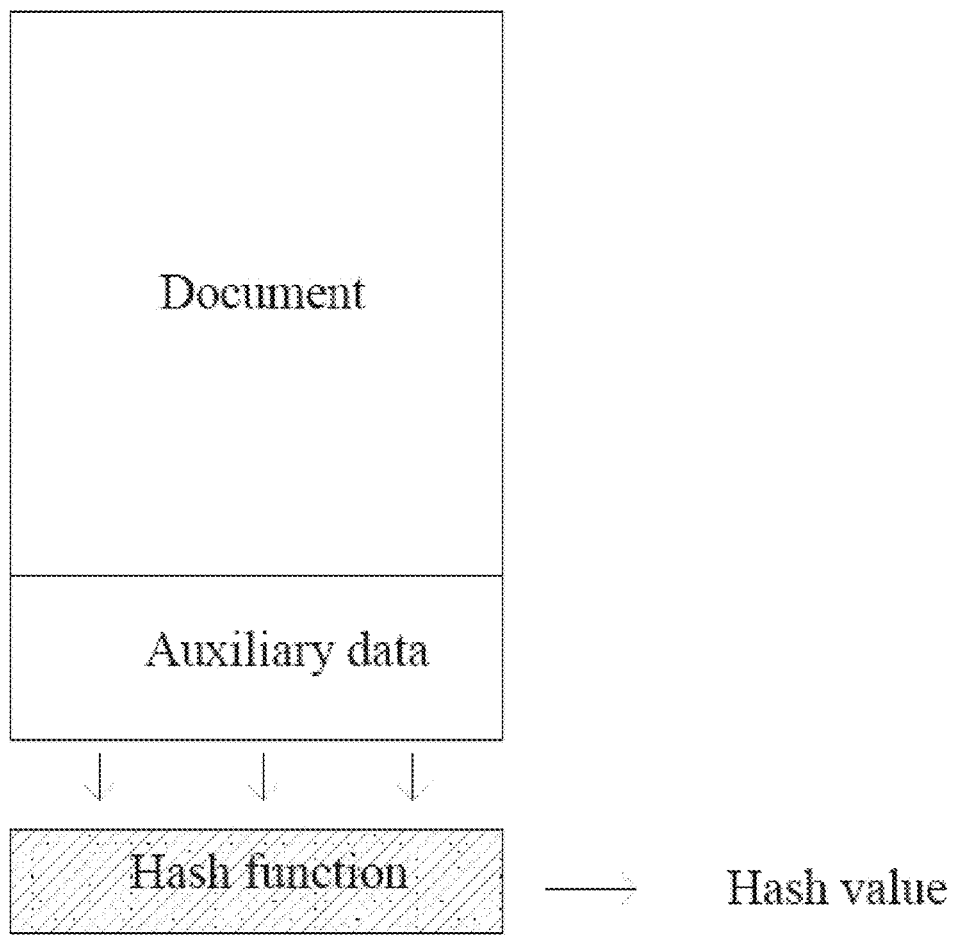
FIG. 11 is a block diagram schematically illustrating another example of biometric file construction.

The invention is described by way of example in which the source file is a document such as a public encryption key appended with auxiliary data. Auxiliary data may consist of the document originator's ID, a time stamp, type of document and any other data. As shown in FIG. 11, a hash function such as the Secure Hash Algorithm (SHA) is used to calculate the message digest value of the document plus auxiliary data. For a particular document and auxiliary data consider that the hash value is denoted by hash value represented as an alphanumeric string. An example is 7km3wa2k9jv8em395m7b3. The partial hash value is denoted as hash value_{partial} and consists of all or part of hash value. Using the same alphanumeric string example the partial hash value, limited to the first 12 characters is 7km3wa2k9jv8.

Figure 12:
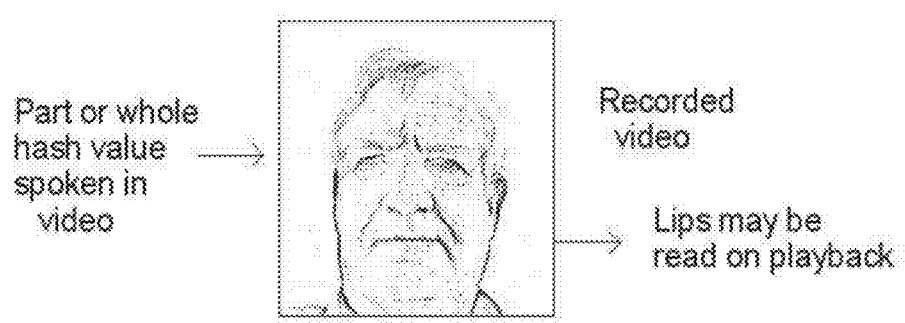
FIG. 12 illustrates another example of a biometric file based on recorded video.

There are a number of different methods in which a biometric information file may contain the partial hash value, hash value_{partial}. In one embodiment, as illustrated in FIG. 12, the originator, or a trusted third party produces a video recording of his/her face with their lips clearly visible, and enunciates the partial hash value so that the partial hash value may be discerned on replay of the video recording. The source file and video recording file are subsequently communicated to the recipient. It is an advantage to encrypt the source file and video recording file prior to communication as this makes tampering more difficult while the files are in transit. The recipient is able to authenticate the ID of the originator, or trusted third party by recognising the person in the video recording by recognising their face, and/or recognising their voice, and/or recognising their gestures, on replay. The recipient is also able to authenticate the source file by calculating the hash value of the source file, forming a partial version, hash value_{partial}, and verifying that this is the same as the hash value_{partial} enunciated in the video recording. If a cryptographic hash function is used it is practically impossible to produce a digital file with a prescribed hash value. It follows that it is practically impossible to produce a fake digital file with the same hash value as the original source file. Further corroboration of the hash value may be provided by reading the lips of and/or by recognising particular voice patterns of the originator, or trusted third party in the video recording to correlate with the spoken hash value_{partial}.

The partial hash value may be communicated by other types of biometric information file. The partial hash value may be communicated by means of gestures of the body recorded in the video recording. As an example, signing using a language utilised by hearing-impaired people may be used. FIG. 6 shows a look up table for hand gestures and letters of the alphabet. Calculating the message digest of the source file using the cryptographic hash function SHA 256 [2] will produce a hash value 256 bits long. As there are 26 letters in the alphabet, a combination of any 3 letters provides a total of 26*26*26=17576 combinations. A look-up table may be constructed by assigning $2^{14}$=16384 of these 3 letter combinations to each of the 16384 different bit patterns of length 14 bits. Correspondingly a hash value_{partial} formed from the first 84 bits of the 256 bit hash value may be represented by 6 three letter sequences, a total of 18 hand gestures. An example of such a hash value_{partial} is the sequence KWY KCO SSP NWF PPE XIG.

Figure 13:
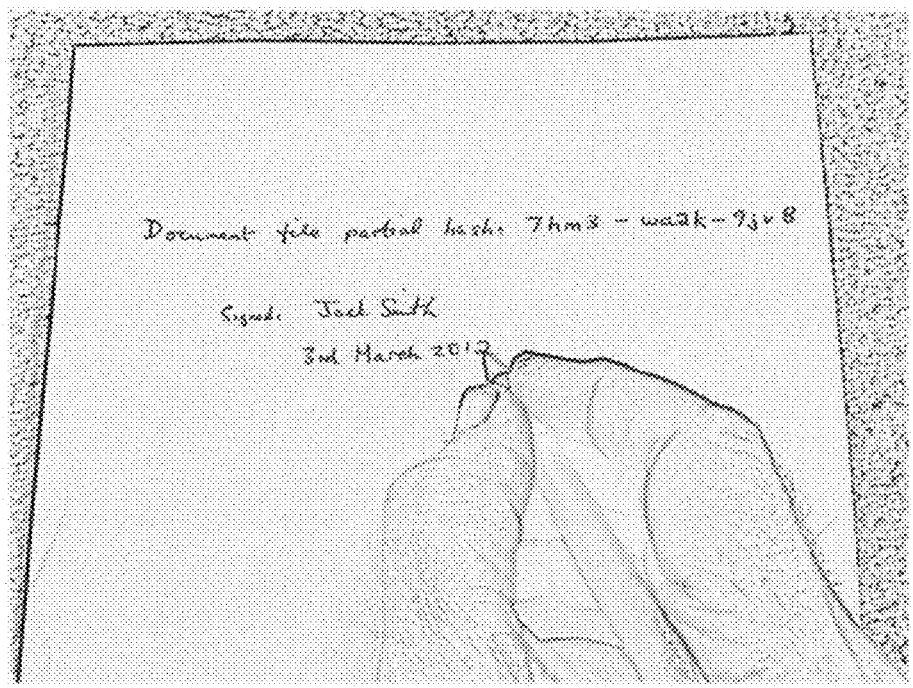
FIG. 13 illustrates an example of a biometric file based on a written version of the hash value.

A biometric information file can also consist of a video recording or photograph of the originator, or trusted third party writing the hash value_{partial} on a piece of paper and may also include the originator, or trusted third party signing and dating the said piece of paper. An illustration of this is shown in FIG. 13.

Figure 14:
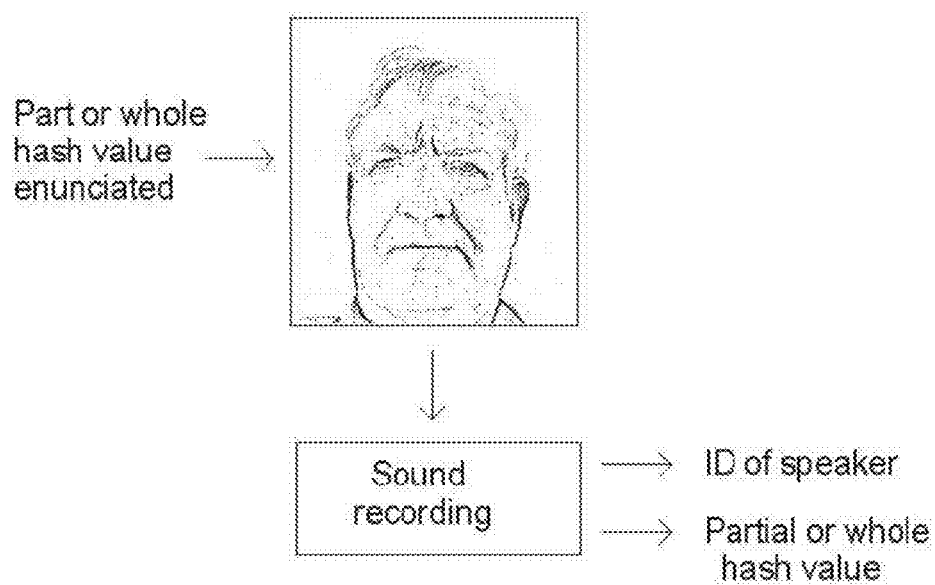
FIG. 14 illustrates another example of a biometric file based on recorded audio.

In another embodiment the person providing the biometric authentication information and this may be the originator of the document file or a trusted third party, makes a sound recording of themselves speaking the partial hash value as illustrated in FIG. 14. Authentication is provided by the recipient calculating the hash value of the document file, deriving the partial hash value, recognising the person's voice in the sound recording and hearing the same partial hash value being spoken by that person in the sound recording.

Figure 15:
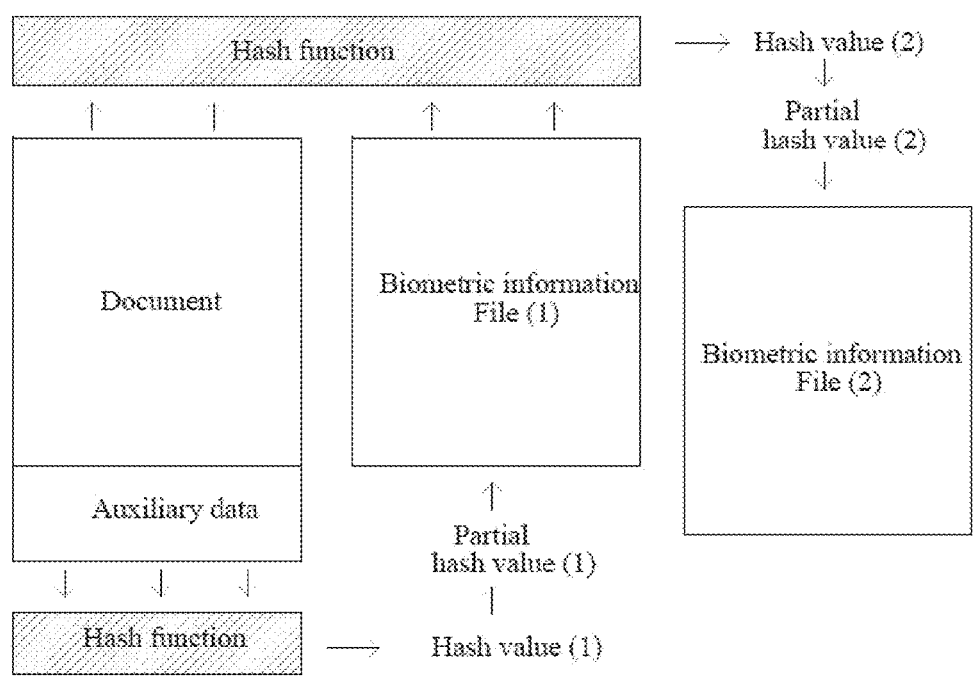
FIG. 15 is a block diagram schematically illustrating construction of a series of biometric files in a nested authentication arrangement.

In a further embodiment additional biometric authentication information may be provided by a series of trusted third parties in a nested authentication arrangement which may be useful in cases where the originator of the document is not expected to be known to the intended recipient. As shown in FIG. 15 the document file and the originator's biometric information containing the hash value_{partial}(1) are combined together and the hash of this composite file is calculated, with the result denoted as hash value(2). The truncated version of this denoted as hash value_{partial}(2) is included in one or more biometric information files produced by the trusted third party. As described above a biometric information file can consist of a video recording of the trusted third party enunciating the hash value_{partial}(2); or communicating the hash value_{partial}(2) value by bodily gestures, including hand gestures; a video recording or photograph of the trusted third party writing the hash value_{partial}(2) on a piece of paper and signing their name; or a sound recording of the trusted third party enunciating the hash value_{partial}(2) or a combination thereof. It is apparent that the nesting procedure may continue resulting in a series of trusted third parties authenticating previously authenticated composite files, producing biometric information files each conveying a hash value_{partial} authenticating the previous composite file so that at the $j^{th}$ step, the $(j-1)^{th}$ trusted third party produces one or more biometric information files (j) each of which include hash value_{partial}(j). This arrangement is similar to the chain-of-trust in Public-Key Infrastructure.

In another embodiment of the invention a digital signature of the source file is generated using the hash value as input to the signature. Part of the digital signature is appended to the source file and the rest of the digital signature is communicated in one or more biometric information files. This embodiment is described by way of example using the RSA digital signature standard given in the Digital Signature Standard (FIPS PUB 186-3, Digital Signature Standard (DSS), Federal Information Processing Standards Publication). The public key which is used by the recipient to verify the digital signature consist of integers n and e. The private key used by the originator, or trusted third party consists of the integers n and d. The digital signature is a calculated integer given by $\sigma$=hash value$^d$ which is split into two parts, $\sigma_l$ and $\sigma_r$ such that sigma is equal to $\sigma_l$ appended with $\sigma_r$. An example is sigma=8249567123995334 with $\sigma_l$=82495671239 and $\sigma_r$=95334. The integer $\sigma_r$ is communicated in one or more biometric information files and $\sigma_l$ is appended to the source file. The reason for subdividing a into two parts is that typically a is too large an integer to be communicated practically in a biometric information file. The integer $\sigma_r$ may be communicated directly as an integer or represented as an alphanumeric string which is usually shorter. The recipient determines the integer $\sigma_r$ from one or more received biometric files and constructs the integer a using the appended source file and uses the public key to calculate $m^\wedge=\sigma^e$ modulo n. The source file is verified by the digital signature if $m^\wedge$ is equal to hash value calculated by hashing the received source file.

Another method of digitally signing a source file is to use the McEliece public key encryption system, as discussed in A Public-Key Cryptosystem based on Algebraic Coding Theory, R. J. McEliece DSN Progress Report 42-44, 1978, with additional features as described in the applicants' UK patent GB2473154. This embodiment is described by way of example using a short code length of 32 bits. Practical arrangements may use codes of longer length such as 65536 bits. The public key is a reduced echelon binary generator matrix of a scrambled, permuted Goppa code, an example of length 32 bits is shown below:

```
1 0 0 0 0 0 0 0 0 0 0 0 0 1 0 1 1 0 1 0 1 0 1 0 0 0 1 1 1 1 1
0 1 0 0 0 0 0 0 0 0 0 1 0 0 0 1 0 0 1 0 0 0 1 0 0 1 0 1 1 1 0
0 0 1 0 0 0 0 0 0 0 0 0 1 1 0 0 1 0 1 1 1 1 0 0 1 1 0 0 0 0
0 0 0 1 0 0 0 0 0 0 0 1 1 1 0 1 0 1 0 0 0 0 1 0 1 0 0 0 0 1 0
0 0 0 0 1 0 0 0 0 0 0 0 1 1 0 1 1 1 1 0 1 0 0 1 0 0 0 1 0 0 1
0 0 0 0 0 1 0 0 0 0 0 0 1 0 0 0 1 0 0 1 1 0 1 1 1 1 1 1 1 0 1
0 0 0 0 0 0 1 0 0 0 0 0 1 1 0 0 0 0 1 0 1 1 0 0 1 0 0 1 1 0 0 1
0 0 0 0 0 0 0 1 0 0 0 0 1 1 1 0 1 1 1 1 1 1 0 0 0 1 1 0 0 1 1 1
0 0 0 0 0 0 0 0 1 0 0 0 0 0 0 0 0 0 1 1 0 1 0 0 1 1 0 1 1 0 0 1 1
0 0 0 0 0 0 0 0 0 1 0 0 1 0 0 1 1 1 0 0 1 0 1 1 1 0 0 1 0 1 0 0
```

0 0 0 0 0 0 0 0 0 0 1 0 0 0 0 1 1 0 1 0 1 0 1 1 1 1 0 0 0 1 1 1

0 0 0 0 0 0 0 0 0 0 1 0 0 0 1 0 1 0 1 0 1 1 1 1 1 0 1 0 1 1 0

In this example the binary error correcting code has 20 parity bits and 12 information bits and can correct up to 4 errors in any of the 32 bits. The private key consists of the Goppa code used to generate this generator matrix, the scrambler and permutation matrices. Consider that the source file is appended with an integer index and hashed using a secure hash function such as SHA256 producing a hash value whose first 20 bits are:

0 1 0 0 1 0 1 1 1 1 0 0 1 0 1 1 0 0 1 1

The originator, or trusted third party, uses their private key, considering the 20 bit pattern as a syndrome of the error correcting Goppa code, to find the 4 bit error pattern which produces this syndrome value. This code can correct 4 bit errors so a 4 bit error pattern is determined. In general Goppa codes are represented as an (n,k,t) code and a t bit error pattern is determined. Returning to the example, it is found that errors in the 2nd, 7th, 24th and 30th bit positions produces a syndrome equal to 0 1 0 0 1 0 1 1 1 1 0 0 1 0 1 1 0 0 1 1

This may be verified by determining the parity bits from the generator matrix above for an input vector with 1's in the error positions:

0 1 0 0 0 0 1 0 0 0 0 0 0 0 0 0 0 0 0 0 0 0 0 1 0 0 0 0 0 1 0 0

It is found that the 20 parity bits are:

0 1 0 0 1 0 1 1 1 1 0 0 1 0 1 1 0 0 1 1

The same as the first 20 bits of the hash value.

Having found the error pattern using the private key, the originator, or trusted third party, produces a biometric information file which contains the information of the bit error positions. For example the originator, or trusted third party could produce a video recording of themselves enunciating the numbers 2, 7, 24 and 30.

The recipient receives the source file, the index value and one or more biometric information files. From the biometric information files, the recipient determines the digital signature, which is the numbers 2, 7, 24 and 30 and checks the ID of the person doing the authentication. The recipient then uses the public key, the generator matrix to calculate the syndrome for bit errors in positions 2, 7, 24 and 30. The recipient appends the source file with the index value and uses the hash function SHA256 to determine the hash value. The recipient determines that the digital signature is valid if the first 20 bits of the hash value is equal to the calculated syndrome.

The basis of this digital signing method is that it is practically impossible to determine an error pattern from a syndrome unless it is known from the huge number of possibilities which particular Goppa code was used to construct the generator matrix. That is, it is practically impossible unless the private key is known. However given the digital signature, the error pattern, it is straightforward to calculate the syndrome.

To construct the digital signature it is necessary to have an integer index appended to the source file because not all syndrome values correspond to error patterns that the Goppa code can correct. In practice different index values are tried until a correctible syndrome is found.

A more realistic example uses a Goppa code with parameters (131072,130987,11) which can correct 5 errors. With these parameters, the syndrome is 85 bits long giving an 85 bit digital signature and on average 120 different index values need to be tried by the signer before a correctible error pattern is found.

In another embodiment the person providing the biometric authentication information instead of communicating directly the partial hash value or partial digital signature in a video recording or sound recording, the partial hash value or partial digital signature is communicated indirectly using a codebook look up table where a prearranged phrase or word is substituted, or used in addition, for each character or symbol representing the partial hash value or partial digital signature. As an example for a partial hash value represented as an alphanumeric string qn4c5te9.

The codebook look Up table may be as in Table 2 below.

TABLE 2

| Codebook look up table | |
| --- | --- |
| Character | Phrase |
| 4 | The sky is blue |
| 5 | A fast train |
| 9 | Marigolds and daisies |
| ... | ... |
| c | A tasty dish |
| e | Two rounds of golf |
| n | A relaxing holiday |

Although this results in larger biometric information files, the increased redundancy reduces the risk of error by the recipient in determining the partial hash value or partial digital signature. It also makes the task of forging a biometric information file that much harder. Using a secret look up table and communicating in the biometric information files only the corresponding phrases of the codebook table and not the characters making up the partial hash value or partial digital signature effectively means that the partial hash value or partial digital signature is encrypted before being communicated in a biometric information file. Again this makes the forging of a biometric file more difficult.

Figure 18:
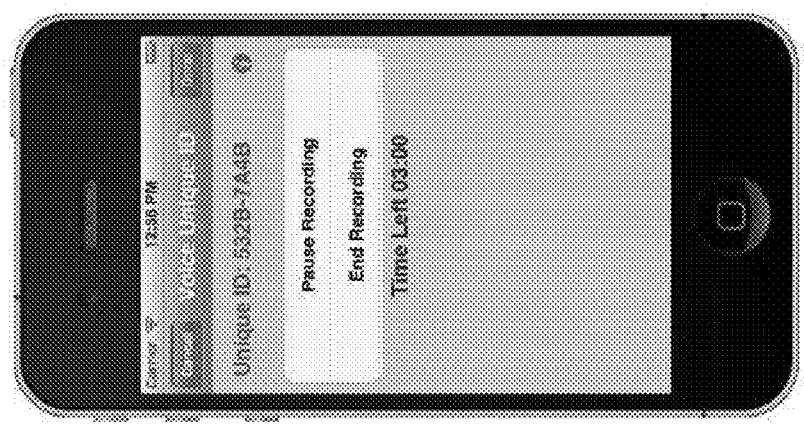
FIGS. 16, 17, and 18 are further example screens displayed by a mobile application according to an alternative embodiment.
Figure 17:
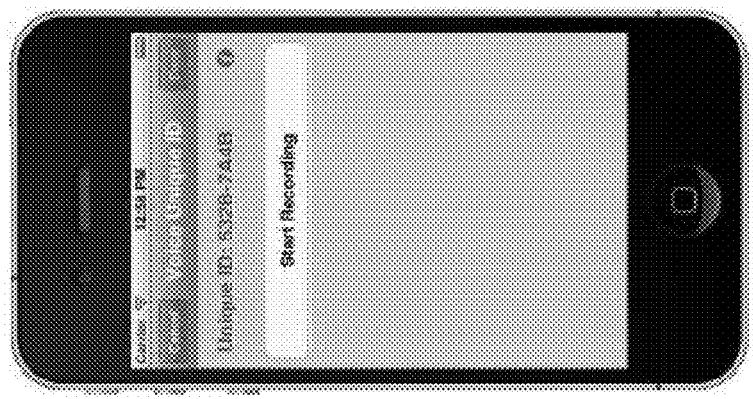
Figure 16:

One example of using the invention to authenticate a public encryption key is given by an iPhone™ App. The App allows users to share digital files securely by encrypting each file using the public keys of the intended recipients and storing the resulting ciphertexts in a cloud type server. Using their iPhones™, the recipients download the ciphertexts and the App uses their private keys to decrypt the contents of the ciphertexts for display, local storage or for hand off to a PC or other device. A critical part of the secure operation of the App is the distribution of each user's public encryption key to a user's contacts and the authentication of the binding of a user's ID to their public key. During setup the App generates a public encryption key for each user and the partial hash value of the key is presented to the user who is invited to make an audio recording identifying himself/herself and enunciating the partial hash value as shown in FIG. 16. In the App the partial hash value is called Unique ID. The user starts the voice recording as shown in FIG. 17, and after recording their voice establishing their ID and including the spoken Unique ID (partial hash value) the user ends the recording as shown in FIG. 18. The public key together with the voice recording are sent to each contact of the user. Each contact on receiving the public key together with the voice recording is invited by the App to listen to the recording, to identify the speaker and to verify that the spoken Unique ID (partial hash value) is identical to the Unique ID (partial hash value) which the App locally calculates from the received public encryption key. Only if the authentication is satisfied does the contact user authorise the App to store the ID and associated public encryption key for future secure sharing of information.

It is apparent that the App could generate other biometric information files such as a video recording as described above as further proof of authentication.

In summary, the invention may be used in a wide number of different applications for access to digitally represented information such as cloud based information services, internet banking, digital rights management, personal information databases, social networking, point of sale transactions, e-mail applications, secure ticketing, message services, digital broadcasting, digital communications, wireless communications, video communications, magnetic cards and general digital storage.

In the embodiments described above, the devices store application modules (also referred to as computer programs or software) in memory (for example, non-transitive computer-readable storage medium, such as a ROM), which when executed, enable the respective device to implement aspects of embodiments of the present invention as discussed herein. As those skilled in the art will appreciate, the software may be stored in a computer program product and loaded into the mobile device using any known instrument, such as removable storage disk or drive, hard disk drive, or communication interface, to provide some examples.

The invention may be implemented on a number of different hardware platforms and devices using custom integrated circuits, Field Programmable Gate Arrays, special and general purpose processors using firmware and/or software.

It will be understood that embodiments of the present invention are described herein by way of example only, and that various changes and modifications may be made without departing from the scope of the invention. Alternative embodiments may be envisaged, which nevertheless fall within the scope of the following claims.

The invention claimed is:

1. A computer-implemented method comprising:
generating transaction data including information associated with a transaction between a first device and a second device, the first device associated with a user;
generating authentication data associated with the transaction data, by:
i) computing a first data representation of the information associated with the transaction using a defined algorithm, wherein the algorithm results in a different data representation when the information changes;
ii) prompting the user to record inputting of the computed first data representation; and
iii) capturing audio and/or video data of the first computed data representation as inputted by the user in response to the prompting, wherein the first computed data representation is implanted into the captured audio and/or video data;
transmitting the transaction data and the associated authentication data to the second device and verifying the transaction data received by the second device, by:
i) computing a second data representation from the received transaction data using the defined algorithm; and
ii) comparing the computed second data representation to the first computed data representation implanted into the audio and/or video data of the received authentication data to identify a match;
wherein an identity of the user associated with the first device is verified from the audio and/or video data of the received authentication data.

2. The method of claim 1, wherein the authentication data provides an irrevocable binding of the transaction data to at least one biometric characteristic of the user.

3. The method of claim 1, further comprising computing the data representation by extracting a portion of the transaction data or computing a function of the transaction data.

4. The method of claim 1, wherein the information associated with the transaction comprises at least a portion of a unique identifier generated for the transaction.

5. The method of claim 1, further comprising determining the identity of the user associated with the transaction from the received authentication data.

6. The method of claim 1, wherein first the computed data representation is implanted into one or more biometric information files by enunciating or writing said computed data representation, or by hand or body gestures representative of said first computed data representation.

7. The method of claim 1, wherein the transaction data comprises an encrypted data portion associated with sensitive information of the transaction.

8. The method of claim 7, wherein the information associated with the transaction comprises binding data derived from at least the encrypted data portion.

9. The method of claim 8, further comprising extracting at least a portion of the encrypted data portion or computing a function of the encrypted data portion as the binding data, whereby the binding data is implanted into the captured audio and/or video data.

10. The method of claim 7, wherein a symmetric encryption key used to generate the encrypted data portion is retained by the user until the sensitive information of the transaction is to be retrieved.

11. The method of claim 7, wherein a cryptographic key of the encrypted data portion is split into a plurality of key portions.

12. The method of claim 8, wherein at least one key portion is retained by the user until the sensitive information of the transaction is to be retrieved.

13. The method of claim 12, wherein at least a predetermined minimum number of received quorum key portions are required to reconstruct the cryptographic key to decrypt the encrypted data portion.

14. The method of claim 7, wherein the encrypted data portion comprises at least one of a predetermined minimum number of quorum portions generated from original data, wherein at least a predetermined minimum number of received quorum data portions are required to reconstruct the original data.

15. The method of claim 14, wherein the received plurality of quorum portions includes at least one portion received from the client device.

16. The method of claim 14, further comprising generating said plurality of quorum portions from original data, and distributing the plurality of quorum portions between a plurality of entities.

17. The method of claim 16, wherein one or more of said entities receives a greater proportion of said quorum portions.

18. The method of claim 16, wherein the entities comprise one or more of: a computing device, an authentication token and a security dongle.

19. The method of claim 14, wherein identified discrepancies in received quorum portions are used to identify the associated entity presenting quorum portions containing corrupted or erroneous values.

20. The method of claim 14, wherein each quorum portion comprises one or more data values each identifying a solution to a respective one of a series of equations that encode dependencies between data values of the original data, each equation associated with a single unknown dependent data value.

21. The method of claim 20, further comprising generating the plurality of quorum portions from said original data, by:
defining a quorum code including data values associated with original data to be encoded, and a predefined number of dependent data values;
determining each said dependent data value as a solution to a respective one of said series of equations that encode dependencies between data values of the original data; and
defining each quorum portion as one or more of said dependent data values.

22. The method of claim 20, further comprising determining reconstructed data from a received plurality of quorum portions, using a series of reconstruction equations each associated with a single unknown value of the candidate data, wherein the reconstructed data includes data values corresponding to the original data and data values corresponding to the plurality of quorum portions generated from said original data.

23. The method of claim 14, further comprising generating a plurality of quorum portions from said original data, wherein each quorum portion includes a corrupted data value at a respective defined position in the original data, and distributing the plurality of quorum portions to a plurality of entities.

24. The method of claim 14, further comprising:
receiving at least a predetermined minimum number of quorum portions generated from original data, wherein each quorum portion includes a corrupted data value at a respective defined position in the original data; and
reconstructing the original data from the received quorum data portions, wherein the original data is reconstructed from the majority data value at each respective defined position of the received quorum portions.

25. The method of claim 14, further comprising:
receiving at least a predetermined minimum number of quorum portions generated from original data, wherein each quorum portion comprises a respective partial encryption key, and at least one ciphertext portion generated by encrypting the original data using an associated encryption key formed from a defined combination of said partial encryption keys; and
decrypting the received ciphertext portions using an associated decryption key formed from the defined combination of received partial encryption keys, to recover the original data.

26. The method of claim 14, wherein each quorum portion is received from a corresponding computing device, together with additional data associated with the computing device, and wherein the defined series of reconstruction relationships encode dependencies between data values of the received versions and the additional data.

27. The method of claim 26, wherein the additional data is associated with a current location and/or current time and/or current date and/or identity of the computing device.

28. The method of claim 14, wherein the original data is a sensitive data file, an encryption or decryption key, an authentication key or a password.

29. A method according to claim 1, wherein the transaction data comprises a plurality of generated authentication data in a nested arrangement whereby successive trusted third parties provide authentication data which may be used to provide additional authentication.

30. The method of claim 1, wherein the second device is a server.

31. The method of claim 1, wherein the captured audio and/or video data comprises a video recording of the user enunciating the first data representation, and wherein the identity of the user is authenticated at the second device by recognising one or more items selected from the group consisting of: the user's face, the user's voice, and one or more gestures made by the user, on replay of the received video recording.

32. A computer-implemented method comprising:
receiving, at a first device associated with a user, transaction data including a data representation of information associated with a transaction between the first device and a second device;
receiving authentication data associated with the transaction data, the authentication data including captured audio and/or video data of a computed data representation as inputted by the user, the first data representation computed from the information associated with the transaction using a defined algorithm, wherein the algorithm results in a different data representation when the information changes, and wherein the first computed data representation is implanted into the captured audio and/or video data; and
verifying the transaction data received by the second device, by:
computing a second data representation from the received transaction data using the defined algorithm; and
comparing the computed second data representation to the first computed data representation implanted into the audio and/or video data of the received authentication data to identify a match;
wherein an identity of the user associated with the first device is verified from the audio and/or video data of the received authentication data.

33. A system comprising one or more hardware computer processors configured to:
generate, by the one or more hardware computer processors, transaction data including information associated with a transaction between a first device and a second device, the first device associated with a user;
generate, by the one or more hardware computer processors, authentication data associated with the transaction data, by:
i) computing a first data representation of the information associated with the transaction using a defined algorithm, wherein the algorithm results in a different data representation when the information changes;
ii) prompting the user to record inputting of the computed first data representation; and iii) capturing audio and/or video data of the computed first data representation as inputted by the user in response to the prompting, wherein the computed first data representation is implanted into the captured audio and/or video; data transmitting the transaction data and the associated authentication data to the second device;

verify the transaction data received by the second device, by:
 i) computing a second data representation from the received transaction data using the defined algorithm; and
 ii) comparing the computed second data representation to the first computed data representation implanted into the audio and/or video data of the received authentication data to identify a match;

wherein an identity of the user associated with the first device is verified from the audio and/or video data of the received authentication data.

34. A non-transitive computer-readable storage medium storing computer-executable instructions to perform a method of:

generating transaction data associated with a transaction between a first device and a second device associated with a user;

generating authentication data providing an irrevocable binding of the transaction data to at least one biometric characteristic of the user, by:

i) computing a first data representation of the information associated with the transaction using a defined algorithm, wherein the algorithm results in a different data representation when the information changes;

ii) prompting the user to record inputting of the computed first data representation; and iii) capturing audio and/or video data of the computed first data representation as inputted by the user in response to the prompting, wherein the computed first data representation is implanted into the captured audio and/or video data;

transmitting the transaction data and the associated authentication data to the server; and verifying the transaction data received by the second device, by:
 i) computing a second data representation from the received transaction data using the defined algorithm; and
 ii) comparing the computed second data representation to the first computed data representation implanted into the audio and/or video data of the received authentication data to identify a match;

wherein an identity of the user associated with the first device is verified from the audio and/or video data of the received authentication data.

* * * * *